US006517289B1

(12) United States Patent
Coakley et al.

(10) Patent No.: US 6,517,289 B1
(45) Date of Patent: Feb. 11, 2003

(54) INFLATABLE VIBRATION REDUCING FAIRING

(75) Inventors: David B. Coakley, Hyattsville, MD (US); Richard K. Knutson, Germantown, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/670,381

(22) Filed: Sep. 28, 2000

(51) Int. Cl.[7] .................................................. F15D 1/10
(52) U.S. Cl. ........................ 405/216; 405/211; 114/243
(58) Field of Search ............................... 405/211, 211.1, 405/216; 114/243

(56) References Cited

U.S. PATENT DOCUMENTS 3,233,571 A * 2/1966 Rather et al. ............... 114/243
5,390,619 A * 2/1995 Miller ......................... 114/243
5,421,413 A   6/1995 Allen et al.
5,456,199 A * 10/1995 Kernkamp .................. 114/243
6,244,204 B1 * 6/2001 Weyman ...................... 114/243
6,257,337 B1 * 7/2001 Wells ......................... 114/243

* cited by examiner

Primary Examiner—Frederick L. Lagman
(74) Attorney, Agent, or Firm—Jacob Shuster

(57) ABSTRACT

Components of a flexible fairing shroud are attached adjacent their leading edges to bushings through which the fairing shroud is angularly displaced about a protectively surrounded structure exposed to a fluid medium. Inflow of the fluid medium is thereby accommodated in a direction resulting in inflation of the fairing shroud to a desired streamline shape established and maintained between leading and trailing edges during flow of the fluid medium to substantially reduce vibrations otherwise induced by such flow.

14 Claims, 3 Drawing Sheets

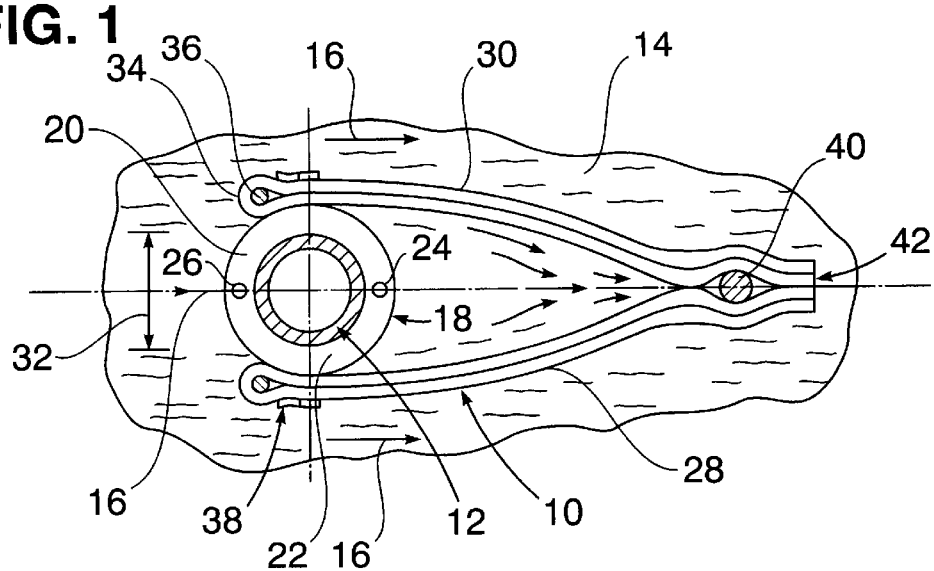
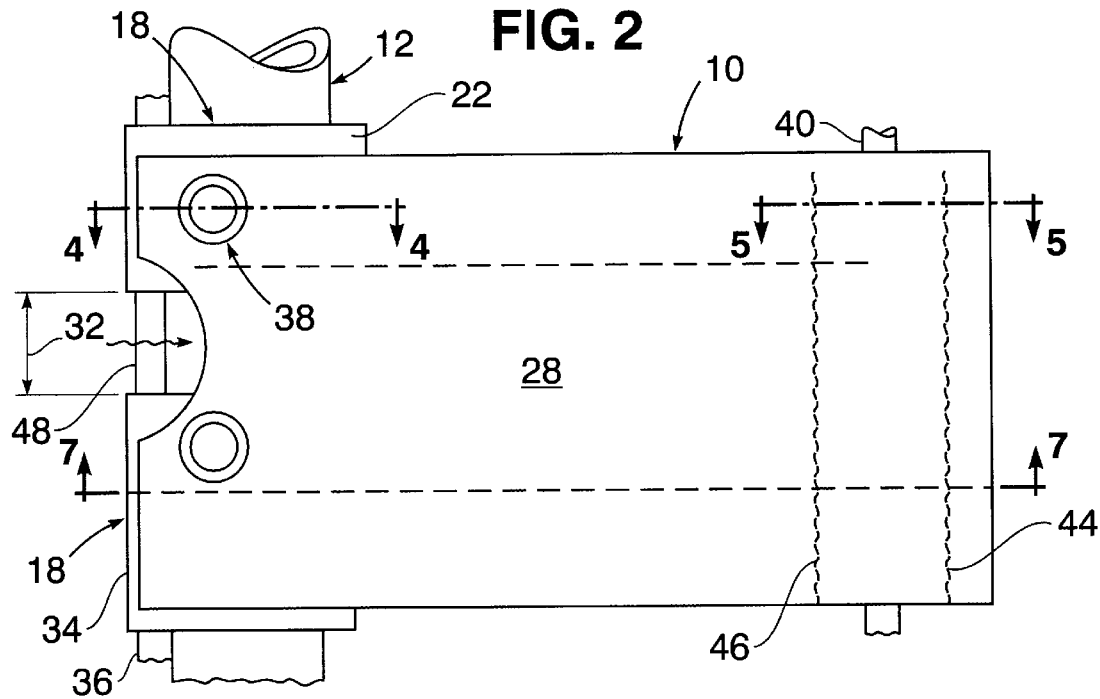

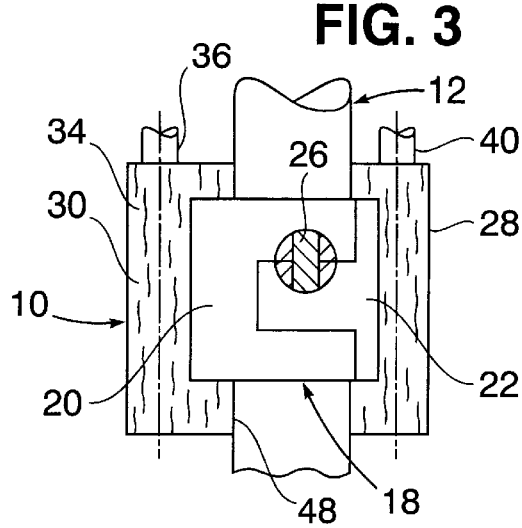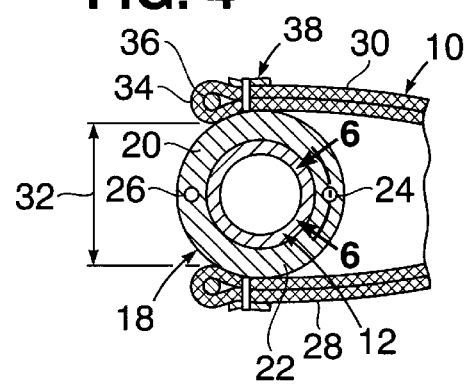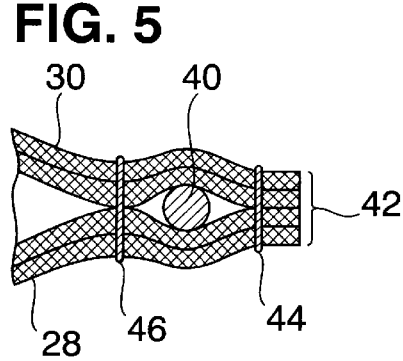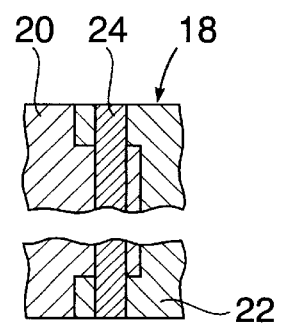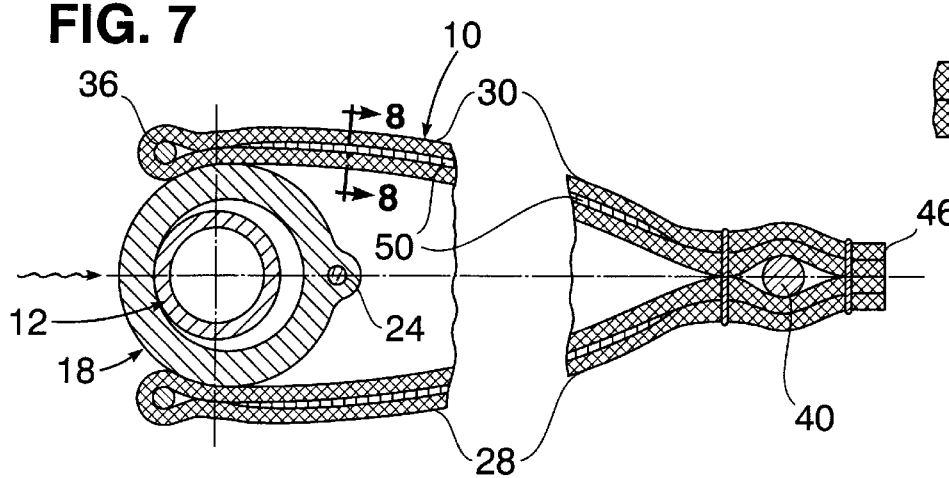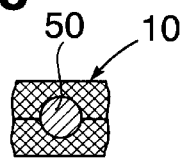

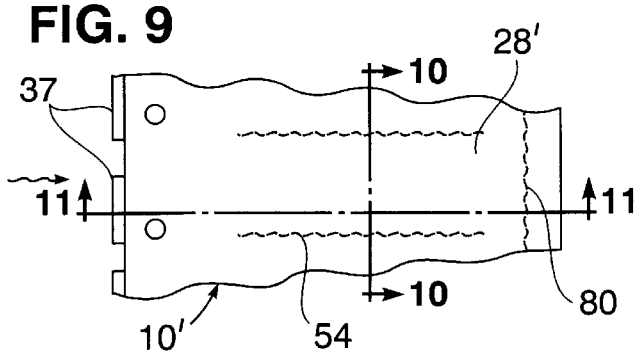
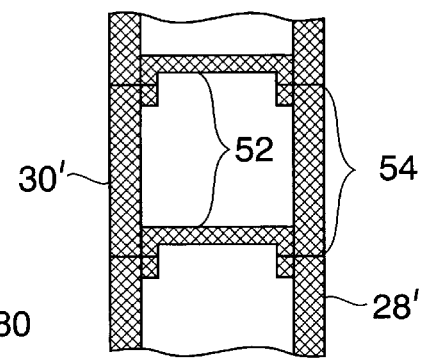
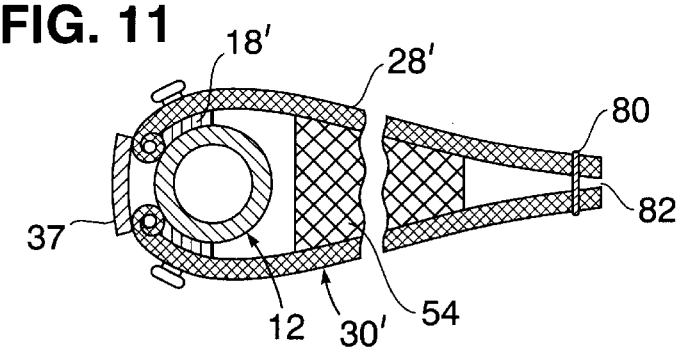
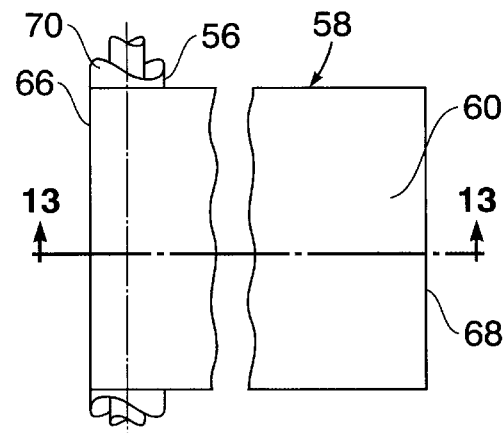
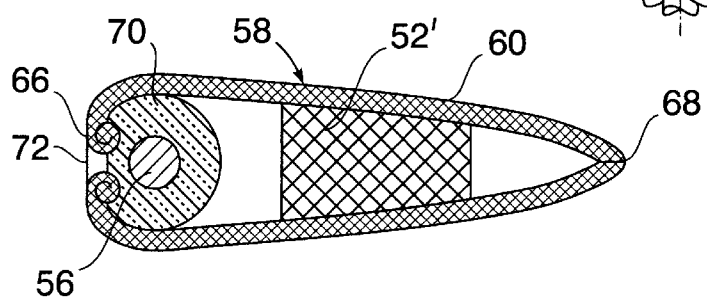

INFLATABLE VIBRATION REDUCING FAIRING

The present invention relates generally to use of flexible fairings to reduce vibration of structures induced by exposure thereof to flow of a fluid medium.

BACKGROUND OF THE INVENTION

The use of flexible fairings in protective surrounding relation to structures such as pipes and cables exposed to a fluid medium under flow, is generally known in the art especially within submerged seawater environment as disclosed for example in U.S. Pat. No. 5,421,413 to Allen et al. Such flexible fairings provide good drag reduction as well to avoid possibly damaging and noisy vortex-induced vibrations in cables or pipes. It is therefore an important object of the present invention to provide an effective and less costly flexible fairing type of protection for pipes or the like, subject to the damaging effect of a fluid medium undergoing flow within submerged seawater environment for example.

SUMMARY OF THE INVENTION

In accordance with the present invention, a flexible fairing is expanded to and maintained in a streamline shaped configuration by dynamic pressure ported internally, such pressure being generated by fluid flow across the fairing. The fairing is accordingly constructed to establish by inflation a streamline shape extending cross-sectionally from its leading edge to a trailing edge in the direction of flow of the fluid medium. Such fairing is swively mounted adjacent its leading edge by bushings on a pipe or cable for rotational displacement thereon to a position wherein the streamline shape is made to extend in the direction of fluid flow by fluid forces acting on the fairing. Various means are utilized to enhance establishment of the streamline shape, such as stiffening rods and separately flexible baffles positioned within flexible shroud material of the fairing in spaced relation to each other.

BRIEF DESCRIPTION OF DRAWING

A more complete appreciation of the invention and many of its attendant advantages will be readily appreciated as the same becomes better understood by reference to the following detailed description when considered in connection with the accompanying drawing herein:

FIG. 1 is a top plan view of an inflated fairing shroud in protective surrounding relation to a submerged seawater pipe;

FIG. 2 is a side elevation view of the fairing shroud shown in FIG. 1, with a leading edge portion thereof broken away;

FIG. 3 is a partial front elevation view of the arrangement illustrated in FIG. 2, with a portion thereof shown in section;

FIGS. 4 and 5 are partial section views taken substantially through planes indicated by section lines 4—4 and 5—5 in FIG. 2;

FIG. 6 is a partial section view taken substantially through a plane indicated by section line 6—6 in FIG. 4;

FIG. 7 is a partial section view taken substantially through a plane indicated by section line 7—7 in FIG. 2;

FIG. 8 is a partial section view taken substantially through a plane indicated by section line 8—8 in FIG. 7;

FIG. 9 is a partial side elevation view similar to that of FIG. 2, showing a modification of the arrangement shown therein;

FIG. 10 is a partial section view taken substantially through a plane indicated by section line 10—10 in FIG. 9;

FIG. 11 is a partial section view taken substantially through a plane indicated by section line 11—11 in FIG. 9;

FIG. 12 is a partial side elevation view similar to that of FIG. 2, showing another embodiment of the present invention; and FIG. 13 is a section view taken substantially through a plane indicated by section line 13—13 in FIG. 12.

DETAILED DESCRIPTION OF PREFERRED EMBODIMENT

Referring now to the drawing in detail, FIG. 1 illustrates a fairing shroud 10 through which a vertically elongated pipe 12 extends within a fluid medium, such as seawater 14, pursuant to one embodiment of the present invention. As shown, the pipe 12 being exposed to the seawater 14, undergoing flow in a direction 16 for example, is thereby subject to high drag forces and vortex-induced vibrations which are substantially reduced in accordance with the present invention by inflation of the fairing shroud 10 in response to dynamic pressure generated by the flow of the seawater 14. The fairing shroud 10 is arranged in protective relation to the pipe 12 by virtue of its construction and attachment to the pipe 12 as hereinafter described.

The pipe 12 being cylindrical in cross-sectional shape forms a rotational support for the surrounding fairing shroud 10 through an assembly of axially spaced, hinged bushings 18 in the embodiment shown in FIGS. 1, 3, 4 and 6. The fairing shroud 10 is prevented from being axially displaced along the pipe 12 by various means such as a clamping constraint of the bushings 18 on the pipe 12. Each bushing 18 is formed by a pair of interfitted, cylinder-forming sections 20 and 22 hingedly interconnected by a hinge pin 24 and a locking pin 26. The fairing shroud 10 is thereby allowed to swivel about the pipe 12 by being formed principally from a pair of flexible components 28 and 30, made of a fabric material and attached to the bushings 18 spaced from each other by a distance 32 at their leading edges 34 as also shown in FIGS. 1 and 4. In such illustrated embodiment, each flexible component 28 and 30 is folded into two abutting layers from leading edge 34 held assembled on a rigid stiffening rod 36 disposed in parallel spaced relation to the bushings 18. Each of such layered flexible components 28 and 30 is secured to the axially spaced cylindrical bushings 18 by fasteners 38 as shown in FIGS. 1, 2 and 4 so as to maintain the spacing distance 32 between the leading edges 34 exposing the axially spaced bushings 18. The flexible components 28 and 30 extend rearwardly from the bushings 18 toward another stiffening rod 40, and are attached to each other in close spaced adjacency to their trailing edges 42 by parallel spaced stitchings 44 and 46 as shown in FIGS. 2 and 5. Internal pressure within the fairing shroud 10 tending to force the trailing edges 42 toward the pipe 12 at the leading edge, may be resisted by spaced stiffening rods 50 as shown in FIGS. 7 and 8. The flexible components 28 and 30 are thereby held positioned on the stiffening rods 36 and 40 to predetermine a desired aerodynamic or streamlined cross-sectional shape when the fairing shroud 10 is inflated.

It will be apparent from the foregoing description that a rectangular opening 48 at the leading edges 34 of the fairing shroud 10 between the bushings 18, as shown in FIGS. 2 and 3, is displaced into alignment with fluid flow direction 16 to receive an oncoming inflow of fluid which thereby enters into the fairing shroud 10 between the spaced bushings 18 for inflation thereof to its streamline shape as shown in FIG. 1, under the dynamic pressure so developed inside. Such streamline shape is maintained by the dynamic pressure during flow of the seawater 14 relative to the pipe 12, in order to achieve a substantial reduction in drag and flow-induced vibration of the pipe 12.

FIGS. 9, 10 and 11 illustrate a modification of the arrangement hereinbefore described with respect to FIGS. 1–8. In order to enhance establishment and maintenance of the dynamic pressure induced streamline shape of a fairing shroud 10' as well as to reduce complexity of its manufacture, flexible fabric baffles 52 are secured by stitching 54 to a pair of outer flexible components 28' and 30' of the fairing shroud. Such baffles 52 are located between the leading and trailing edges of the fairing shroud in spaced relation to each other as shown in FIG. 10. Also partial bushings 18' attached to the leading edges of flexible components 28' and 30' are utilized without hinges axially spaced to accommodate openings at the leading edge of the fairing shroud. Stiffening rods 36 are provided for the flexible components 28' and 30' at the leading edge on the partial bushings 18' as shown in FIG. 11. Spaced straps 37 are also attached to the shroud components at the leading edge as shown in FIGS. 11 and 12. At the trailing edge of the shroud 10' as shown in FIGS. 9 and 11, the flexible components 28' and 30' are interconnected by stitching 80 and thereby held spaced apart to form an exit gap 82.

The basic concepts underlying the present invention as hereinbefore described with respect to FIGS. 1–11 may also be applicable to structures exposed to fluid medium environments other than seawater, such as cable exposed to air during aircraft flight. FIGS. 12 and 13 illustrate such a cable 56 on which a fairing shroud 58 is formed by a pair of flexible molded plastic sheets 60. The molded plastic sheets 60, made of polyethylene for example, are thickened at the leading and trailing edge portions as shown in FIG. 12. The trailing edge 68 is formed by heat welding of the plastic sheets 60 thereat as shown in FIG. 13. At the leading edge 66 the flexible sheets 60 are glued into a bushing 70 through which the cable 56 extends. The fairing shroud 58 is mounted for angular displacement about the cable 56 by flow of air relative thereto. Slots 72 are formed in the bushing 70 at the leading edge 66 as shown in FIG. 13 for access of an inflow of the air which thereby passes through the pores of the porous material of bushing 70 into the fairing shroud to dynamically establish and maintain its streamline shape. As in the case of the embodiment shown in FIGS. 9, 10 and 11, baffles 52' as shown in FIG. 13 are utilized to maintain fairing shape and are heat welded to the flexible sheets 60. In this embodiment the fairing shroud 58 is pulled over the cable 56 before use since the bushing 70 does not open.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a structure exposed to a fluid medium undergoing flow relative thereto, with flexible means protectively surrounding said structure for reducing vibration thereof induced by said flow of the fluid medium, the improvement residing in said flexible means including: an inflatable fairing through which said structure extends; means within the fairing for maintaining a cross-sectional streamline shape thereof between leading and trailing edges to which the fairing is expanded by inflation; and means responsive to inflow of the fluid medium into the fairing for causing said inflation of the fairing by dynamic pressure upon angular displacement of the fairing by the fluid medium in a direction of flow.

2. The combination as defined in claim 1, wherein said inflow responsive means comprises: spaced bushings attached to the fairing adjacent to said leading edge and forming an opening therebetween through which said inflow enters into the fairing.

3. In combination with a structure to a fluid medium undergoing flow relative thereto, with flexible means protectively surrounding said structure for reducing vibration thereof induced by said flow of the fluid medium, the improvement residing in said flexible means including: an inflatable fairing through which said structure extends; stiffening means within the fairing for predetermining a cross-sectional streamline shape between leading and trailing edges to which the fairing is expanded by inflation; and means mounting the fairing for angular displacement by the fluid medium in a direction of the flow to accommodate inflow of the fluid medium causing said inflation of the fairing to said streamline shape by dynamic pressure, said mounting means comprising spaced bushings attached to the fairing adjacent to said leading edge and forming an opening therebetween through which said inflow into the fairing occurs, said fairing comprising a pair of flexible shroud components; stitching means for attaching the flexible components to each other adjacent to the trailing edge; and fastener means for attaching the flexible components to the mounting means in spaced relation to each other at the leading edge.

4. The combination as defined in claim 3, wherein said structure is a pipe and the fluid medium is seawater.

5. In combination with a pipe exposed to seawater undergoing flow relative thereto, flexible means protectively surrounding said pipe for reducing vibration thereof induced by said flow of the seawater, comprising: an inflatable fairing through which said pipe extends; means mounting the fairing for angular displacement by the seawater in a direction of the flow to accommodate inflow causing inflation of the fairing to a streamline shape by dynamic pressure; and stiffening means for predetermining said streamline shape of the fairing between leading and trailing edges thereof, comprising: rigid rods extending in spaced relation to each other through the fairing said mounting means comprising spaced bushings attached to the fairing adjacent to said leading edge and forming an opening therebetween through which said inflow occurs; and said fairing comprising: a pair of flexible shroud components through which the rigid rods of the stiffening means extend; means for respectively attaching the flexible components to each other adjacent to the trailing edge and to the mounting means in spaced relation to each other at the leading edge while holding the rigid rods assembled within the flexible components.

6. In combination with a structure exposed to a fluid medium undergoing flow relative thereto, with flexible means protectively surrounding said structure for reducing vibration thereof induced by said flow of the fluid medium, the improvement residing in said flexible means including: an inflatable fairing through which said structure extends; stiffening means within the fairing for predetermining a cross-sectional streamline shape between leading and training edges to which the fairing is expanded by inflation; and means mounting the fairing for angular displacement by the fluid medium in a direction of the flow to accommodate inflow of the fluid medium causing said inflation of the fairing to said streamline shape by dynamic pressure, said fairing comprising a pair of flexible shroud components through which the stiffening means extends; stitching means for attaching the flexible components to each other adjacent to the trailing edge; and fastener means for attaching the flexible components to the mounting means in spaced relation to each other adjacent to the leading edge.

7. In combination with a structure exposed to a fluid medium undergoing flow relative thereto, flexible means protectively surrounding said structure for reducing vibration thereof induced by said flow of the fluid medium, comprising: an inflatable fairing through which said structure extends; stiffening means within the fairing for predetermining a cross-sectional streamline shape thereof between leading and trailing edges; and means mounting the fairing for angular displacement by the fluid medium in a direction of the flow to accommodate inflow of the fluid medium causing inflation of the fairing to said streamline shape by dynamic pressure; said fairing comprising: a pair of flexible shroud components through which the stiffening means extends; stitching means for attaching the flexible components to each other adjacent to the trailing edge; and fastener means for attaching the flexible components to the mounting means in spaced relation to each other adjacent to the leading edge; and said stiffening means comprising rigid rods extending in spaced relation to each other through the flexible components of the fairing and respectively held assembled therein by the fastener means and the stitching means.

8. In combination with a structure exposed to a fluid medium undergoing flow relative thereto, with flexible means protectively surrounding said structure for reducing vibration thereof induced by said flow of the fluid medium, the improvement residing in said flexible means including: an inflatable fairing through which said structure extends; stiffening means within the fairing for predetermining a cross-sectional streamline shape between leading and trailing edges to which the fairing is expanded by inflation; and means mounting the fairing for angular displacement by the fluid medium in a direction of the flow to accommodate inflow of the fluid medium causing said inflation of the fairing to said streamline shape by dynamic pressure, said mounting means comprising spaced bushings attached to the fairing adjacent to said leading edge and forming an opening therebetween through which said inflow into the fairing occurs, and said structure being a pipe and the fluid medium being water.

9. In combination with a structure exposed to a fluid medium undergoing flow relative thereto, flexible means protectively surrounding said structure for reducing vibration thereof induced by said flow of the fluid medium, comprising: an inflatable fairing through which said structure extends; said fairing being formed from flexible plastic sheets fastened to each other adjacent to leading and trailing edges; stiffening means within the fairing including thickened portions of the plastic sheets at the leading and trailing edges for predetermining a cross-sectional streamline shape of the fairing between the leading and trailing edges; and means mounting the fairing for angular displacement by the fluid medium in a direction of the flow to accommodate inflow of the fluid medium causing inflation of the fairing to said streamline shape by dynamic pressure.

10. The combination as defined in claim 9, wherein the mountain means comprises a porous bushings having access slots through which said inflow of the fluid medium is received.

11. In combination with a structure exposed to a fluid medium undergoing flow relative thereto, flexible means protectively surrounding said structure for reducing vibration thereof induced by said flow of the fluid medium, comprising: an inflatable fairing through which said structure extends; stiffening means within the fairing for predetermining a cross-sectional streamline shape thereof between leading and trailing edges; and means mounting the fairing for angular displacement by the fluid medium in a direction of the flow to accommodate inflow of the fluid medium causing inflation of the fairing to said streamline shape by dynamic pressure, and mounting means comprising a porous bushing having access slots through which said inflow of the fluid medium is received.

12. The combination as defined in claim 11, wherein said fairing is formed from flexible plastics sheets fastened to each other and to the bushing at one leading edge through which the inflow produced the dynamic pressure extending to the trailing edge.

13. In combination with a structure exposed to a fluid medium undergoing flow relative thereto and a flexible fairing protectively surrounding said structure; means for inflating said fairing to a streamline shape to reduce vibration of the structure induced by said flow of the fluid medium, including: means within the fairing for maintaining cross-sectional streamline shape thereof between leading and trailing of edges to which the fairing is expanded by inflation; and inflow means through which said fluid medium enters the fairing for generating dynamic pressure therein to establish said streamline shape during said flow of the fluid medium by inflow into the fairing inducing expansion to said streamline shape.

14. In combination with a structure exposed to a fluid medium undergoing flow relative thereto, with flexible means protectively surrounding said structure; means for inflating said fairing to a streamline shape to reduce vibration of the structure induced by said flow of the fluid medium, including: means within the fairing for predetermining a cross-sectional streamline shape thereof between leading and trailing edges to which the fairing is expanded; and inflow means through which said fluid medium enters the fairing for generating dynamic pressure therein to establish and maintain said streamline shape by expansion during said flow of the fluid medium; said flexible comprising a pair of flexible shroud components and said means for predetermining the cross-sectional shape of the fairing includes flexible baffles interconnected between the flexible shroud components.

* * * * *